(12) United States Patent
Janssen et al.

(10) Patent No.: US 11,662,508 B2
(45) Date of Patent: May 30, 2023

(54) HIGH PRECISION OPTICAL LOCKER

(71) Applicant: Lumentum Operations LLC, San Jose, CA (US)

(72) Inventors: Adrian Perrin Janssen, Paignton (GB); Robert Simpson, Paignton (GB); Paul Firth, Totnes (GB)

(73) Assignee: Lumentum Operations LLC, San Jose, CA (US)

( * ) Notice: Subject to any disclaimer, the term of this patent is extended or adjusted under 35 U.S.C. 154(b) by 4 days.

(21) Appl. No.: 17/526,827

(22) Filed: Nov. 15, 2021

(65) Prior Publication Data

US 2023/0025759 A1  Jan. 26, 2023

Related U.S. Application Data

(60) Provisional application No. 63/203,434, filed on Jul. 22, 2021.

(51) Int. Cl.
  *G02B 5/28* (2006.01)
  *G01J 9/02* (2006.01)
  *G02B 17/00* (2006.01)

(52) U.S. Cl.
  CPC ............ *G02B 5/284* (2013.01); *G01J 9/0246* (2013.01); *G02B 17/006* (2013.01); *G01J 2009/0257* (2013.01)

(58) Field of Classification Search
  CPC ..... G02B 5/284; G02B 17/006; G01J 9/0246; G01J 2009/0257
  See application file for complete search history.

(56) References Cited

U.S. PATENT DOCUMENTS

| | | | | |
|---|---|---|---|---|
| 6,621,580 | B2* | 9/2003 | Myatt | H01S 5/0687 356/519 |
| 10,050,405 | B2 | 8/2018 | Kiong et al. | |
| 2003/0118269 | A1* | 6/2003 | Wimperis | G02B 27/108 385/14 |
| 2004/0257657 | A1* | 12/2004 | Meadowcroft | G02B 5/04 359/577 |
| 2007/0253063 | A1* | 11/2007 | Hruska | G02B 5/284 359/589 |

\* cited by examiner

*Primary Examiner* — Jonathan M Hansen
(74) *Attorney, Agent, or Firm* — Harrity & Harrity, LLP

(57) ABSTRACT

In some implementations, an optical assembly comprises an optical cavity; one or more detectors; and an optical component having an input face and an output face configured to receive an input beam to the input face and to produce one or more primary output beams, and a plurality of secondary output beams from the output face, the secondary output beams resulting from multiple internal reflections within the optical component. At least one of the input face is not perpendicular to the input beam or the output face is not perpendicular to the one or more primary output beams. Each primary output beam is transmitted through the optical cavity perpendicular to at least one surface of the optical cavity, and directed to a respective one of the one or more detectors. Each detector is arranged to exclude at least a portion of each secondary output beam.

18 Claims, 16 Drawing Sheets

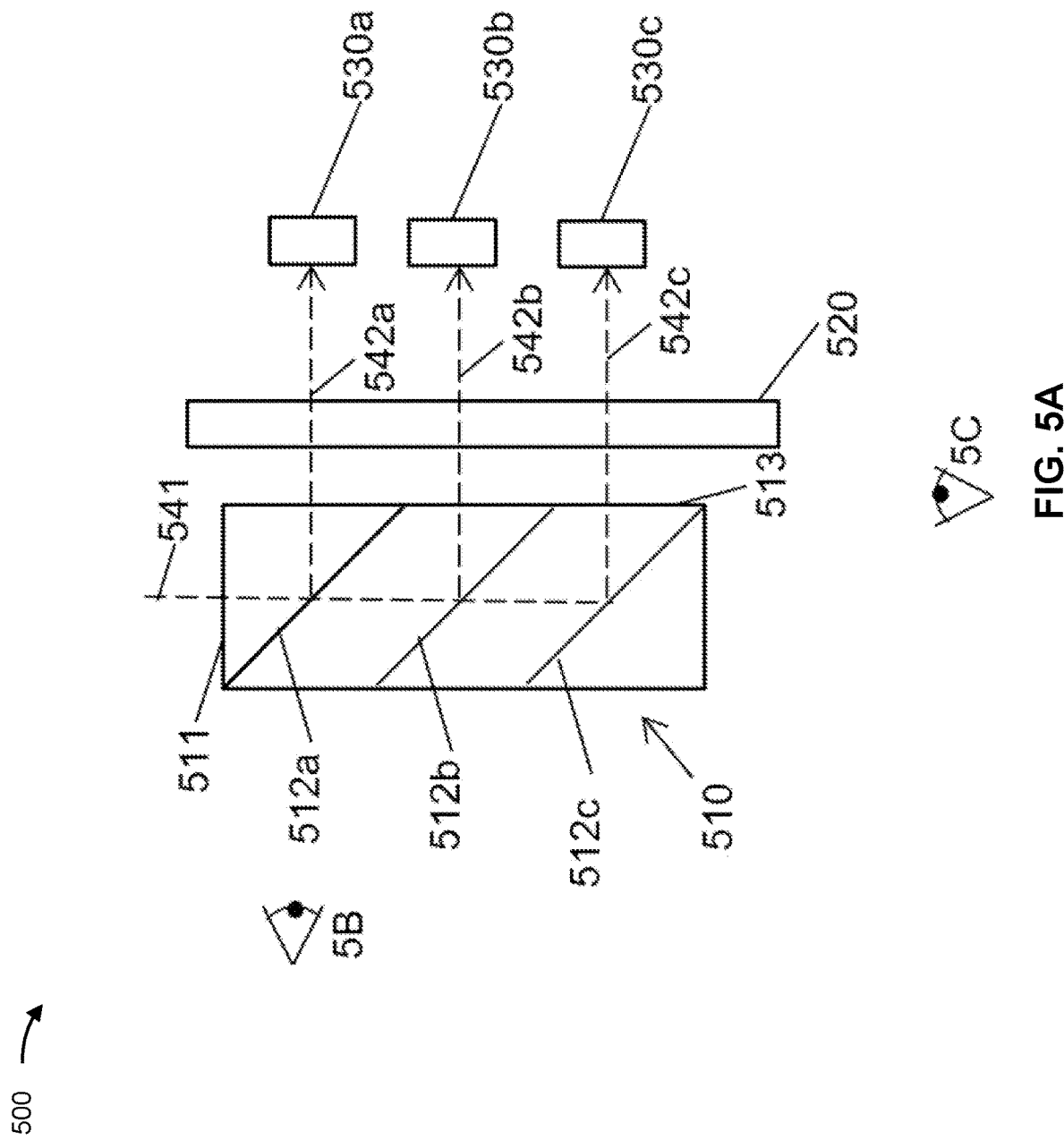

HIGH PRECISION OPTICAL LOCKER

RELATED APPLICATION

This application claims priority to U.S. Provisional Patent Application No. 63/203,434, entitled "HIGH PRECISION WAVELENGTH LOCKER," filed on Jul. 22, 2021, the content of which is incorporated by reference herein in its entirety.

TECHNICAL FIELD

The present invention relates to free-space optical components. In particular, the invention relates to an optical assembly e.g. for use in an optical locker.

BACKGROUND

An optical locker is a control device for an optical system which "locks" an optical signal (typically a laser source) to a desired wavelength or frequency. An optical locker comprises an optical assembly for measuring the wavelength or frequency of the optical signal, and a controller implementing a feedback loop which adjusts the source of the optical signal in dependence upon the measurement.

Typically, the optical assembly comprises an etalon, also known as a Fabry-Perot interferometer. In order to normalize the etalon response, i.e. ensure that the measurements used for the feedback loop are independent of the power of the source of the optical signal, the optical signal is typically measured both before and after passing through the etalon. This is achieved by the use of a beam splitter between the optical source and the etalon, with one output of the beam splitter being passed straight to a detector, and the other passing through the etalon before being measured by a different detector. The measurement before passing through the etalon (the "reference measurement") is a measure of the overall power of the optical signal, independent of wavelength. The measurement after passing through the etalon (the "output measurement") is dependent on the wavelength of the optical signal and its power. As such, by taking the ratio (or other suitable transformation) of the reference measurement and the output measurement, an overall measurement can be obtained which only depends on the wavelength.

The etalon may be replaced by an alternative optical cavity. An optical cavity, (also called a resonating cavity or optical resonator) is assembly of reflective surfaces arranged to produce a standing wave resonator for light. Light confined in the cavity reflects from the reflective surfaces, with certain resonant frequencies producing standing waves within the cavity. The interference of this light with itself results in the transmission of light through the cavity depending on the frequency of the light, and in particular the relationship of the frequency to the resonant frequencies of the cavity.

Optical assemblies as described above can provide very accurate measurements of wavelength. However, their sensitivity also makes them vulnerable to interference, as stray light being picked up by either detector can severely compromise their precision. In addition, the optical assembly comprises several precision components, which must be properly aligned for the optical locker to function. Additionally, the number of components required is significant (at minimum, a beam splitter, an etalon, and two detectors—and usually at least one mirror or other optical component used to route the light), and this results in the optical assembly taking up a lot of space, which is a design challenge for the use of optical lockers in small-scale devices.

To conserve space within an optical apparatus, there is a general desire to reduce the size of the optical assemblies used to measure wavelength (or frequency) in an optical locker. In current designs, the etalon, beam splitter, and any mirror arrangements are usually separated by some distance significantly larger than the width of the etalon. A more compact optical assembly can be made by collocating the etalon, beam splitter, and at least the first mirror of any mirror arrangement, i.e. such that the distance between the etalon and the other components is less than the width of the etalon.

However, such an arrangement causes issues with additional cavities created by the other components. An example of this is illustrated in FIG. 1 for an optical assembly comprising a beam splitter 101, an etalon 102, and a prism 103 acting as a mirror. The beam splitter has an input surface A, a surface B which is adjacent to the etalon, a secondary output surface E, a beam splitter surface Y and an upper surface F. The etalon has surfaces N and M which are shared with the beam splitter and prism respectively. The prism has a surface C which is adjacent to the etalon, and an output surface D. Light (shown as a dotted line) passes through the optical assembly, resulting in a reference output 110 and an etalon output 120, which are then measured by detectors. Each of the surfaces A through F can form a cavity with each other surface (some requiring reflection from the mirror X or the beam splitter surface Y), and the desired etalon is only formed between surfaces N and M. Each of these cavities will act as an etalon, and will affect the signal received at the detectors, causing large errors.

FIG. 2A shows the signal at the output detector from an example configuration of optical assembly as shown in FIG. 1. Such a signal is practically unusable for optical locking, as the error is of a similar magnitude to the actual signal. This occurs because the additional cavities formed are of a similar scale to the desired etalon cavity, and so there are in effect several etalon signals of different cavity length being overlaid. FIG. 2B shows the output signal for an equivalent optical assembly with anti-reflective coatings applied to surfaces other than those of the desired etalon (i.e. other than N and M), which reduce reflections to 0.1% (around the state of the art for such coatings). While the signal is significantly improved compared to FIG. 2A, there is still a large amount of distortion visible in the graph. As such it is clear that anti-reflective coatings cannot be the entire solution here.

SUMMARY

In some implementations, an optical assembly comprises: an optical cavity; one or more detectors; and an optical component having an input face and an output face configured to receive an input beam to the input face and to produce one or more primary output beams, and a plurality of secondary output beams from the output face, the secondary output beams resulting from multiple internal reflections within the optical component; wherein: at least one of the input face is not perpendicular to the input beam or the output face is not perpendicular to the one or more primary output beams; each primary output beam is transmitted through the optical cavity perpendicular to at least one surface of the optical cavity, and directed to a respective one of the one or more detectors; and each detector is arranged to exclude at least a portion of each secondary output beam.

In some implementations, an optical assembly comprises: an optical cavity; one or more detectors; and an optical component having an input face and an output face configured to receive an input beam to the input face and to produce one or more primary output beams, and a plurality of secondary output beams from the output face, the secondary output beams resulting from multiple internal reflections within the optical component, wherein: at least one of the input face is not perpendicular to the input beam or the output face is not perpendicular to the one or more primary output beams; the input beam is received from the optical cavity and is perpendicular to at least one surface of the optical cavity; each primary output beam is directed to a respective one of the one or more detectors; and each detector is arranged to exclude at least a portion of each secondary output beam.

BRIEF DESCRIPTION OF THE DRAWINGS

FIGS. 5A-5C show a further alternative example configuration of an optical assembly.

DETAILED DESCRIPTION

The following detailed description of example implementations refers to the accompanying drawings. The same reference numbers in different drawings may identify the same or similar elements.

Figure 1:
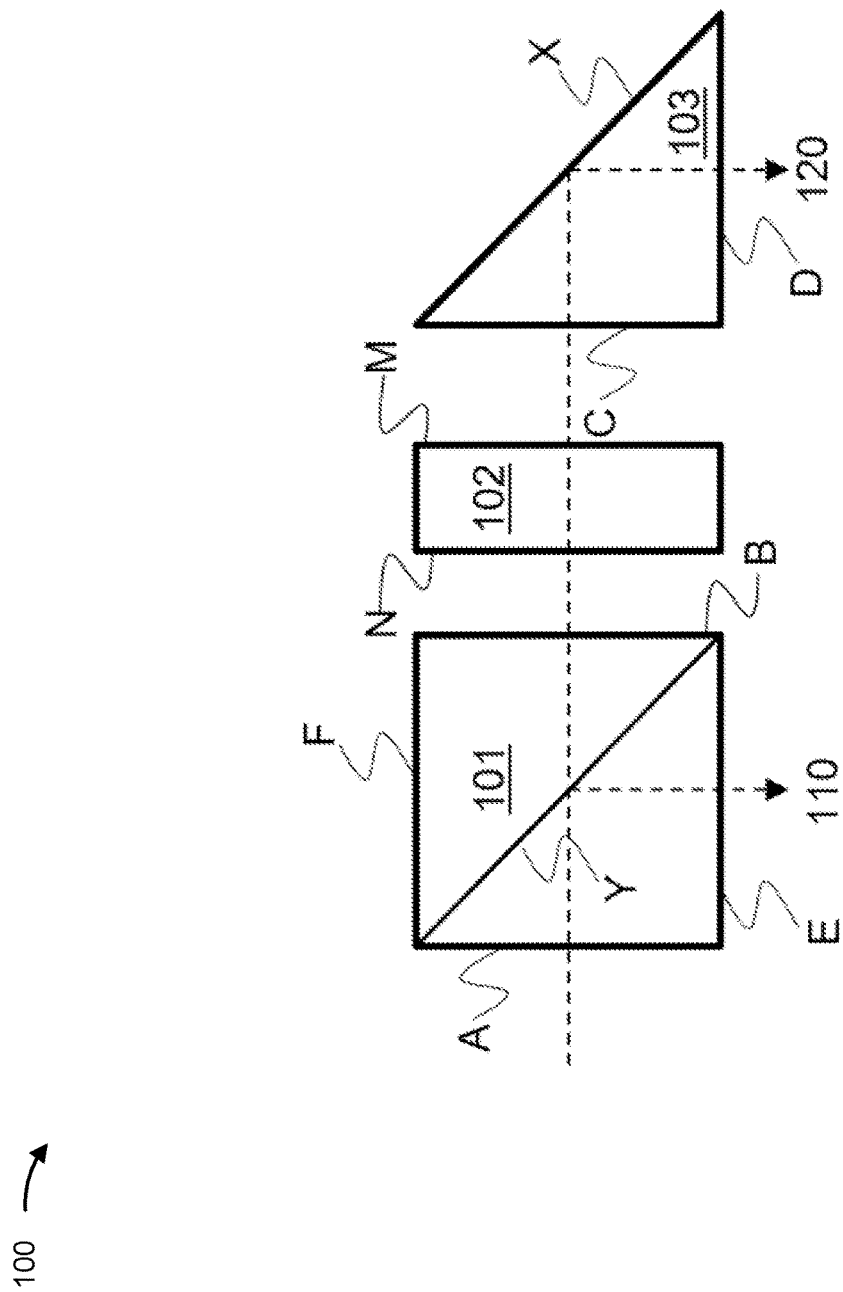
FIG. 1 shows a compact optical assembly with various reflective surfaces marked.
Figure 2A:
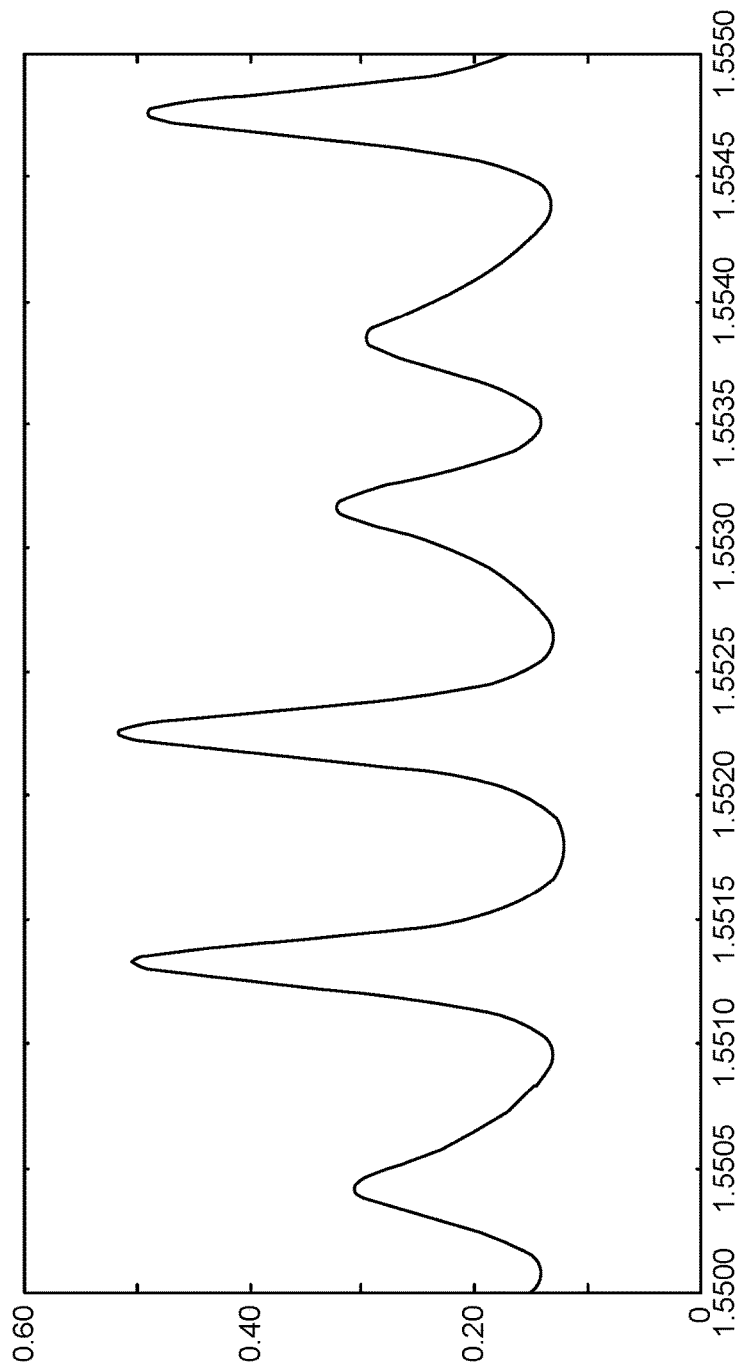
FIG. 2A shows the output of the optical assembly of FIG. 1.
Figure 2B:
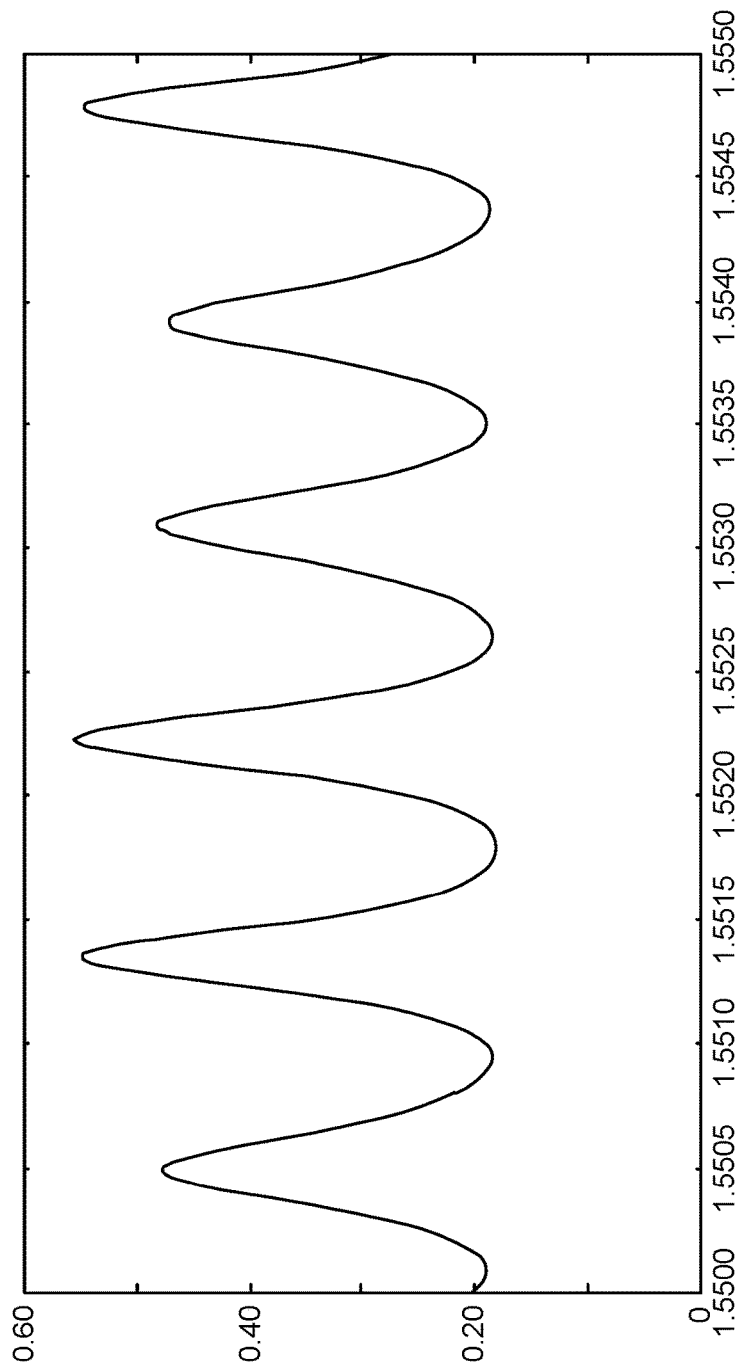
FIG. 2B shows the output of the optical assembly of FIG. 1 where anti-reflective coatings are used.
Figure 3A:
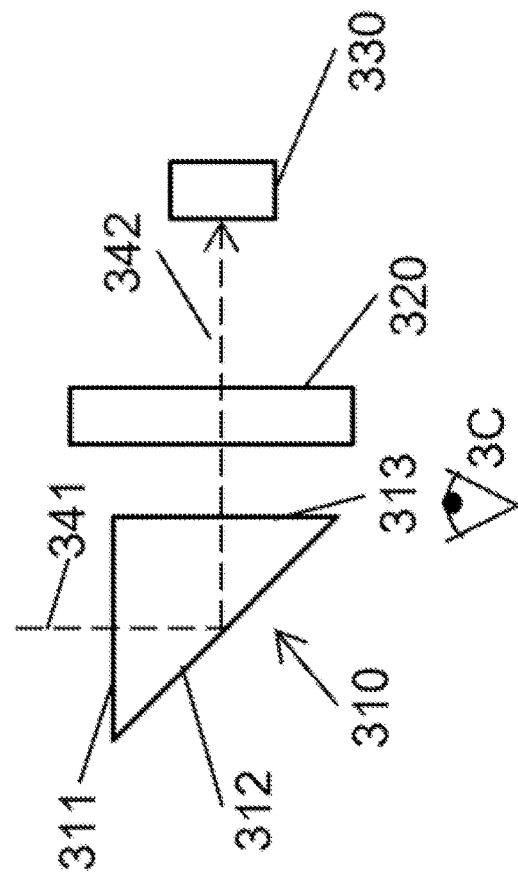
FIGS. 3A-3C show an example configuration of an optical assembly.
Figure 3B:
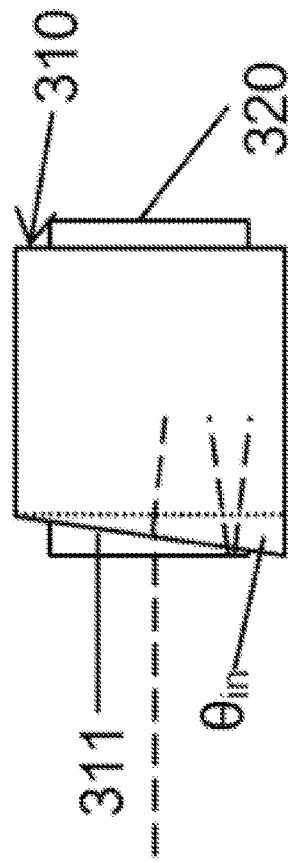
Figure 3C:
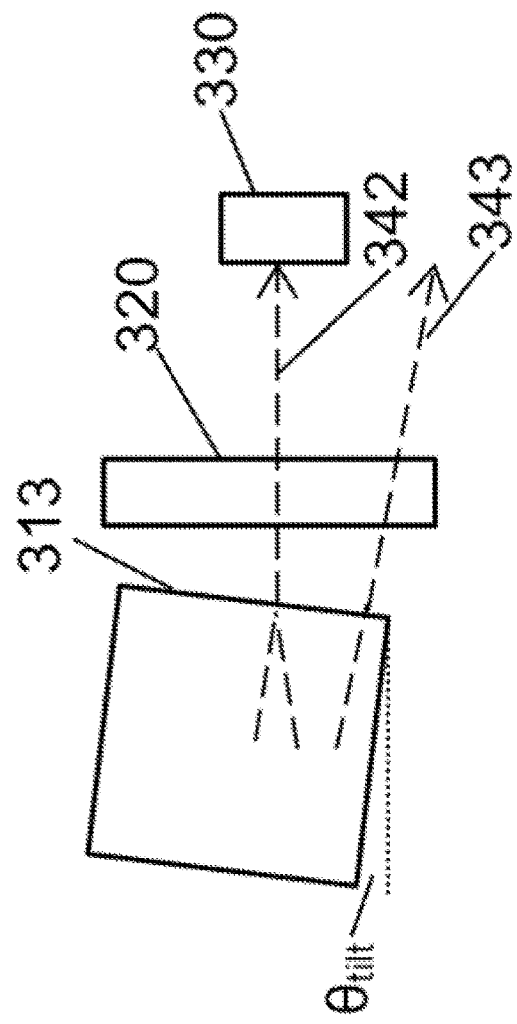

An example configuration of an optical assembly that reduces the impact of the unwanted cavities is shown in FIGS. 3A, 3B, and 3C. FIG. 3A is a plan view of the optical assembly, with FIGS. 3B and 3C being rear and side views as indicated in FIG. 3A. Dotted lines represent the path of light through the assembly. The assembly comprises a prism 310, an etalon 320, and a detector 330. The prism is arranged to act as a reflector and has an input surface 311, a reflection surface 312, and an output surface 313. An input beam 341 incident on the input surface 311 is reflected by the reflection surface 312, transmitted through the etalon 320 via the output surface 313, and received by the detector 330 as primary output beam 342.

To avoid an unwanted optical cavity between the input surface and the output surface, the input surface 311 is angled at an angle $\theta_{in}$ from a plane normal to the incoming input beam. As such, when the beam reaches the output surface, the reflection is displaced (downwards as shown in FIG. 3C), and so any resulting secondary output beam 343 from reflection from the output and input surface is deflected downwards from the primary output beam 342.

However, the angling of the input surface would also result in the primary output beam being deflected downwards, and as such it would no longer pass through the etalon normal to the etalon surfaces. To avoid this, the prism 310 is tilted by an angle $\theta_{tilt}$ (compared to the position it would be in if the input surface were normal to the input beam), such that the primary output beam passes through the etalon perpendicular to the etalon surfaces and is incident on the detector 330. The angle $\theta_{in}$ is chosen such that at least a part of the secondary output beam 343 is excluded by the detector (i.e. falls outside an aperture of the detector), thereby reducing the interference caused by the secondary output beam and any higher order output beams.

Figure 4A:
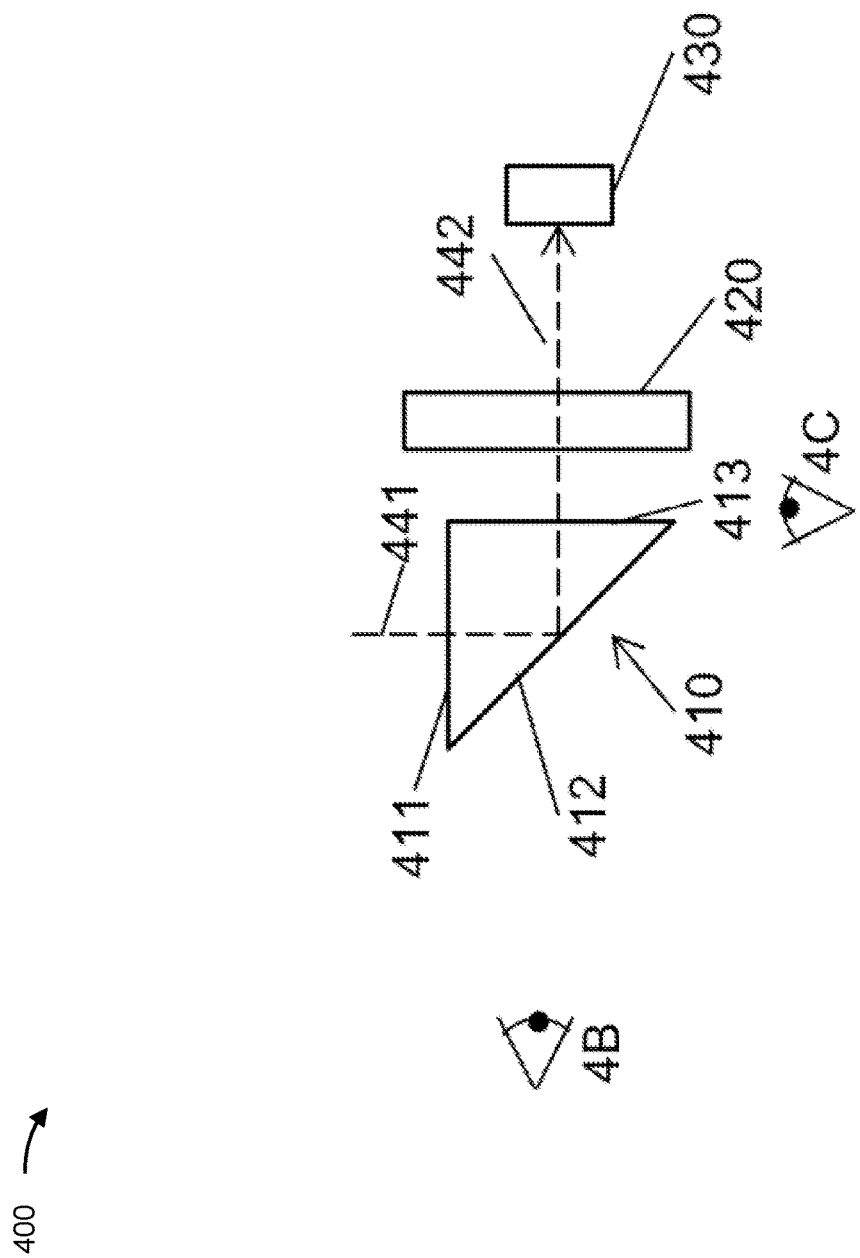
FIGS. 4A-4C show an alternative example configuration of an optical assembly.
Figure 4B:
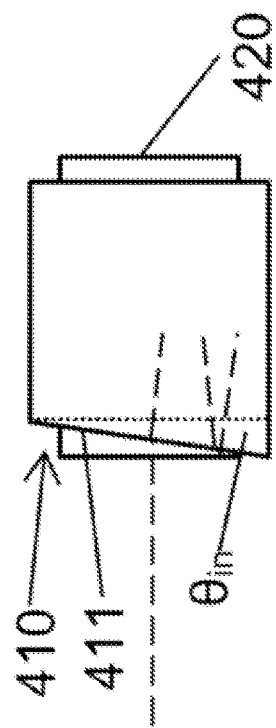
Figure 4C:
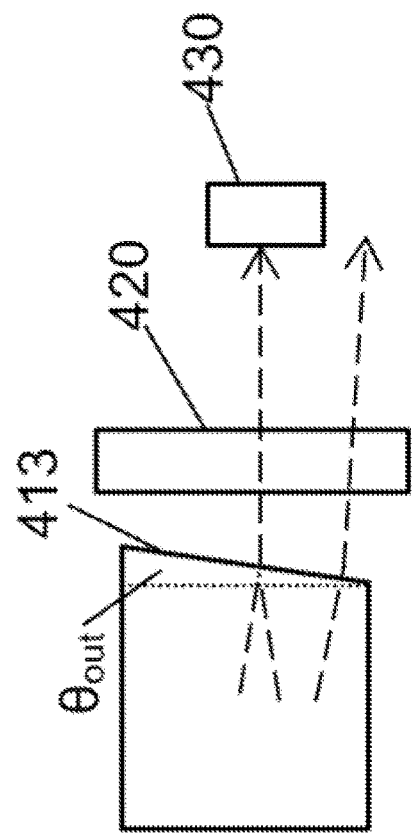

FIGS. 4A, 4B, and 4C show an alternative example configuration of an optical assembly. FIG. 4A is a plan view of the optical assembly, with FIGS. 4B and 4C being rear and side views as indicated in FIG. 4A. Dotted lines represent the path of light through the assembly. The assembly comprises a prism 410, an etalon 420, and a detector 430. The prism is arranged to act as a reflector and has an input surface 411, a reflection surface 412, and an output surface 413. An input beam 441 incident on the input surface 411 is reflected by the reflection surface 412, transmitted through the etalon 420 via the output surface 413, and received by the detector 430 as primary output beam 442.

As in FIGS. 3A-3C, the input surface 411 is angled at an angle $\theta_{in}$ from a plane normal to the incoming input beam. In contrast to FIGS. 3A-3C, to avoid the need to tilt the prism, the output surface 413 is angled at an angle $\theta_{out}$ from a plane normal to the primary output beam after it exits the prism. This angle is chosen to ensure that the primary output beam passes perpendicularly through the etalon and is incident on the detector. In a typical geometry, $\theta_{in}$ will be the same as $\theta_{out}$, but this need not necessarily be the case (e.g. where the primary output beam is not perpendicular to the input beam).

As in the example of FIGS. 3A-3C, the internal reflections within the prism will cause the secondary output beam to be deflected downwards, and the degree and direction of this deflection can be controlled by varying the angles $\theta_{in}$ and $\theta_{out}$ (while maintaining the condition that the primary output beam passes perpendicularly through the etalon to the detector).

In general, the desired effect of deflection of the secondary output beam will be achieved if either or both of the following are true:
 the input surface is at a non-zero angle $\theta_{in}$ to a plane normal to the input beam incident on the input surface, e.g., the input face is not perpendicular to the input beam;
 the output surface is at a non-zero angle $\theta_{out}$ to a plane normal to the primary output beam as it exits the output surface, e.g., the output face is not perpendicular to the primary output beam.

The angles $\theta_{in}$ and $\theta_{out}$ may be between 1 and 15 degrees (e.g., greater than or equal to 1 degree and less than or equal to 15 degrees). The angle $\theta_{in}$ may be equal to the angle $\theta_{out}$ when both of the above conditions are true, or the two angles may be different. The angles may be such that the input face and the output face do not form an optical cavity, i.e. it is not possible for light to resonate by reflecting between the two faces (potentially via other reflective surfaces), and the input and output face are not parallel either as provided or as reflected in other surfaces of the optical component.

Further adjustments to the geometry, such as moving the etalon or detector, or tilting components, may be necessary to ensure that the primary output beam is transmitted perpendicularly through the etalon and is incident on the detector.

Either or both of the input or output face may be provided with an anti-reflective coating to further attenuate the secondary output beams, as the primary output beam does not reflect from either the input or output face.

In the examples of FIGS. 3A-3C and 4A-4C, both the listed conditions are true, due to the simple geometry used where surfaces and light paths are generally parallel or perpendicular to each other except as required to illustrate the principles of this disclosure. However this need not be the case—in a geometry where only one of the input or output faces is not perpendicular to its respective beam the etalon and detector could be positioned such that the primary output beam is transmitted perpendicularly through the etalon and is incident on the detector.

Where the above examples have referred to an etalon, this may be replaced with an alternative optical cavity (also known as an optical resonator or resonant cavity). Similarly, while the example shows a prism, similar principles may be applied to other components of the optical assembly located either before the etalon (i.e. on the path of light between the input and the etalon) or after the etalon (i.e. on the path of light between the etalon and the detector). In the latter case, the "input beam" is the beam from the etalon to the optical component, and the "primary output beam" is the beam from the optical component to the detector, and the relevant positioning criterion is that the input beam passes perpendicularly though the etalon and the primary output beam is incident on the detector. In any case, the detector is arranged to exclude at least a portion of the secondary output beam, e.g. such that at least a portion of the secondary output beam falls outside an aperture of the detector, or on a region of the detector which is ignored in the measurements, or on an intervening opaque surface. An example of a component after the etalon is a mirror block which reflects the beam transmitted through the etalon to the detector.

Figure 5B:
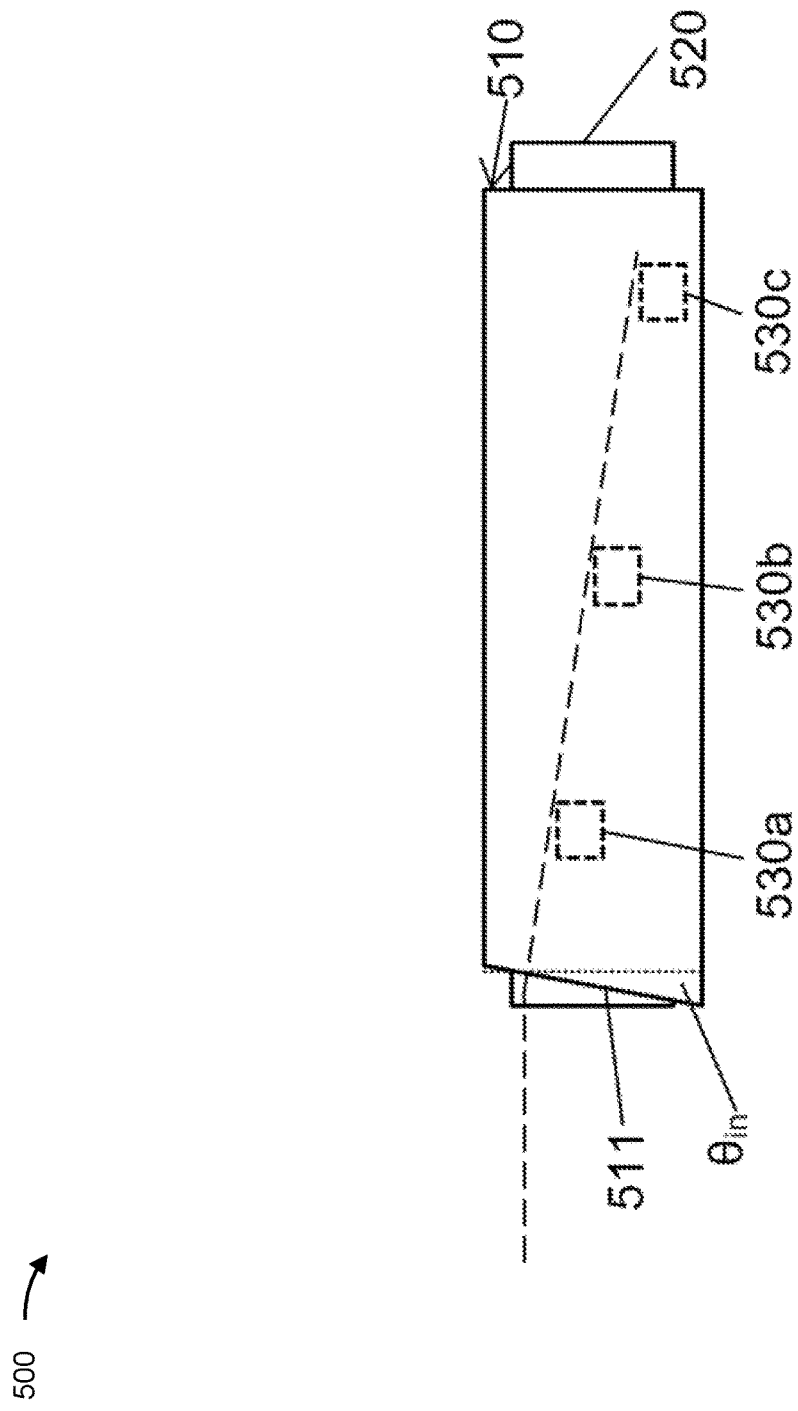
Figure 5C:
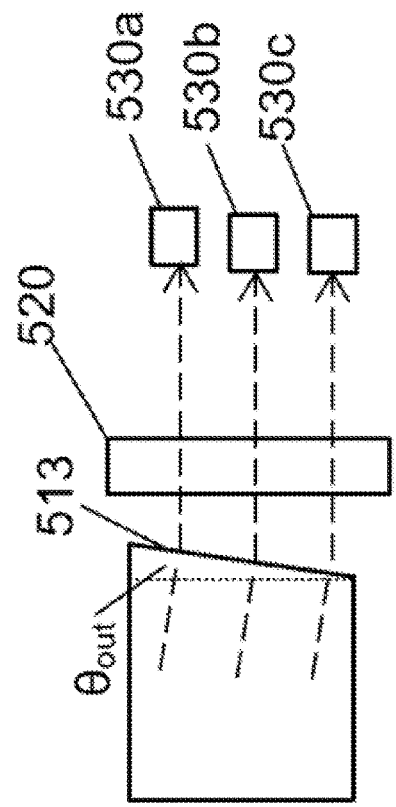

FIGS. 5A, 5B, and 5C show a further alternative example configuration of an optical assembly where the optical component is a beam splitter having multiple outputs. FIG. 5A is a plan view of the optical assembly, with FIGS. 5B and 5C being rear and side views as indicated in FIG. 5A. Dotted lines represent the path of light through the assembly. The assembly comprises a beam splitter 510, an etalon 520, and a plurality of detectors 530a, b and c. The beam splitter has an input surface 511, a plurality of reflection surfaces 512 a, b and c, and an output surface 513. An input beam 541 incident on the input surface 511 is reflected by the reflection surfaces 512a, b, c, and each of the respective primary output beams 542a, b, c is transmitted through the etalon 520 via the output surface 513, and received by the respective detector 530a, b, c. The beam splitter may have additional outputs (not shown) which do not pass through the etalon, e.g. an output used for normalization which goes directly to a further detector (not shown).

As in FIGS. 4A-4C, the input surface 511 is angled at an angle $\theta_{in}$ from a plane normal to the incoming input beam, and the output surface 513 is angled at an angle $\theta_{out}$ from a plane normal to the primary output beams after they exit the beam splitter.

As shown in FIGS. 5B and 5C, due to the beam being displaced downwards as it passes through the beam splitter, the detectors 530a, b, c (shown as dotted lines in 5B to represent their position behind the beam splitter and etalon) are positioned such that the sensitive region of each detector is displaced downwards and sideways from the previous detector, in order to intercept the path of the respective primary output beam.

The beams will in general not be ideally collimated, e.g. they may have a Gaussian profile. As such it is not possible to exclude all of the secondary output beams, as some tiny portion of it will extend to the beam axis of the primary output beam. As potential guidelines for placing the detectors, they may be arranged to exclude at least the beam axis of the secondary output beam, or to exclude all portions of secondary output beam where the intensity of the secondary output beam is above a threshold fraction of the intensity on the beam axis of the secondary output beam.

Figure 6B:
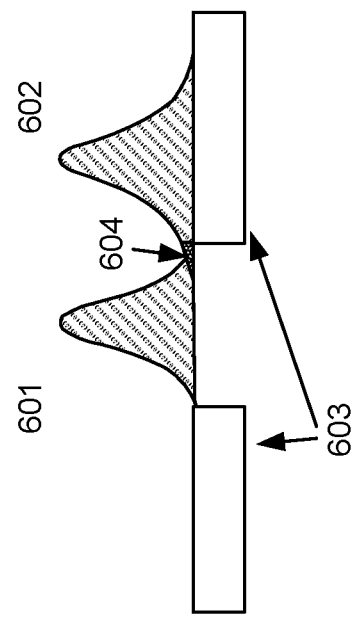
FIGS. 6A-6B illustrate passing of primary and secondary beams through an aperture.
Figure 6A:
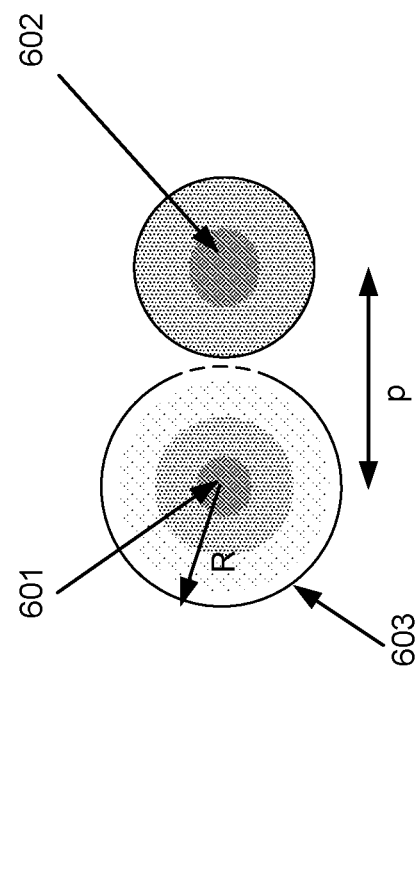

For a Gaussian beam, the beam radius r may be defined as the distance between the beam center and the point where the intensity falls to $1/e^2$ of the maximum intensity, with the beam diameter being twice this radius. An alternative definition of the beam diameter is the full width at half maximum, FWHM. The acceptable separation between the beams depends on proportion of the secondary beam which can be acceptably detected, and can be calculated based on the beam parameters and the error which can be tolerated. This is illustrated in FIGS. 6A and 6B, which show a first beam 601 and a second beam 602 with their centers separated by a distance p passing through an aperture 603 of radius R. Due to the Gaussian profiles of the beams, a small portion 604 of the second beam will enter the aperture.

Figure 7:
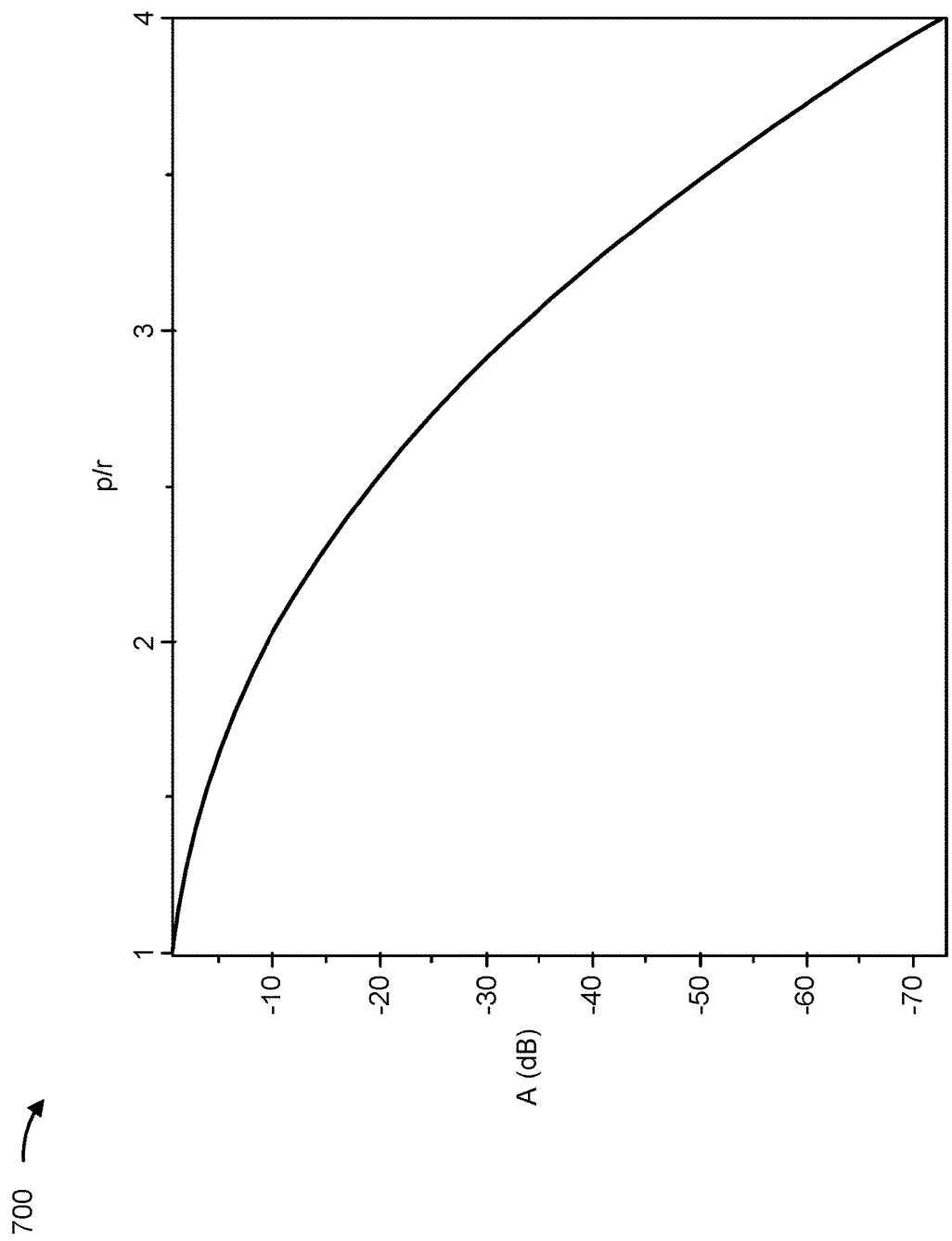
FIG. 7 is a graph of power attenuation against beam separation for a particular configuration.

For a first and second beam, where the first beam is the required output beam and the second beam is an unwanted interfering beam (e.g. a secondary beam from the plate beam splitter), FIG. 7 shows the power attenuation A from the second beam into the first beam vs the beam separation p as a multiple of the Gaussian beam radius r as defined above. In this example, the detector is positioned and sized to receive 99% of the total intensity of the first beam. The p=4 value corresponds to a beam separation of twice the beam diameter, as described above, resulting in a power attenuation of about −70 dB. The power ratio of the first beam to the second beam as measured at the detector will be the negative of the power attenuation from the second beam into the first beam when measured in decibels, i.e. the above example has a power ratio of 70 dB.

Figure 8:
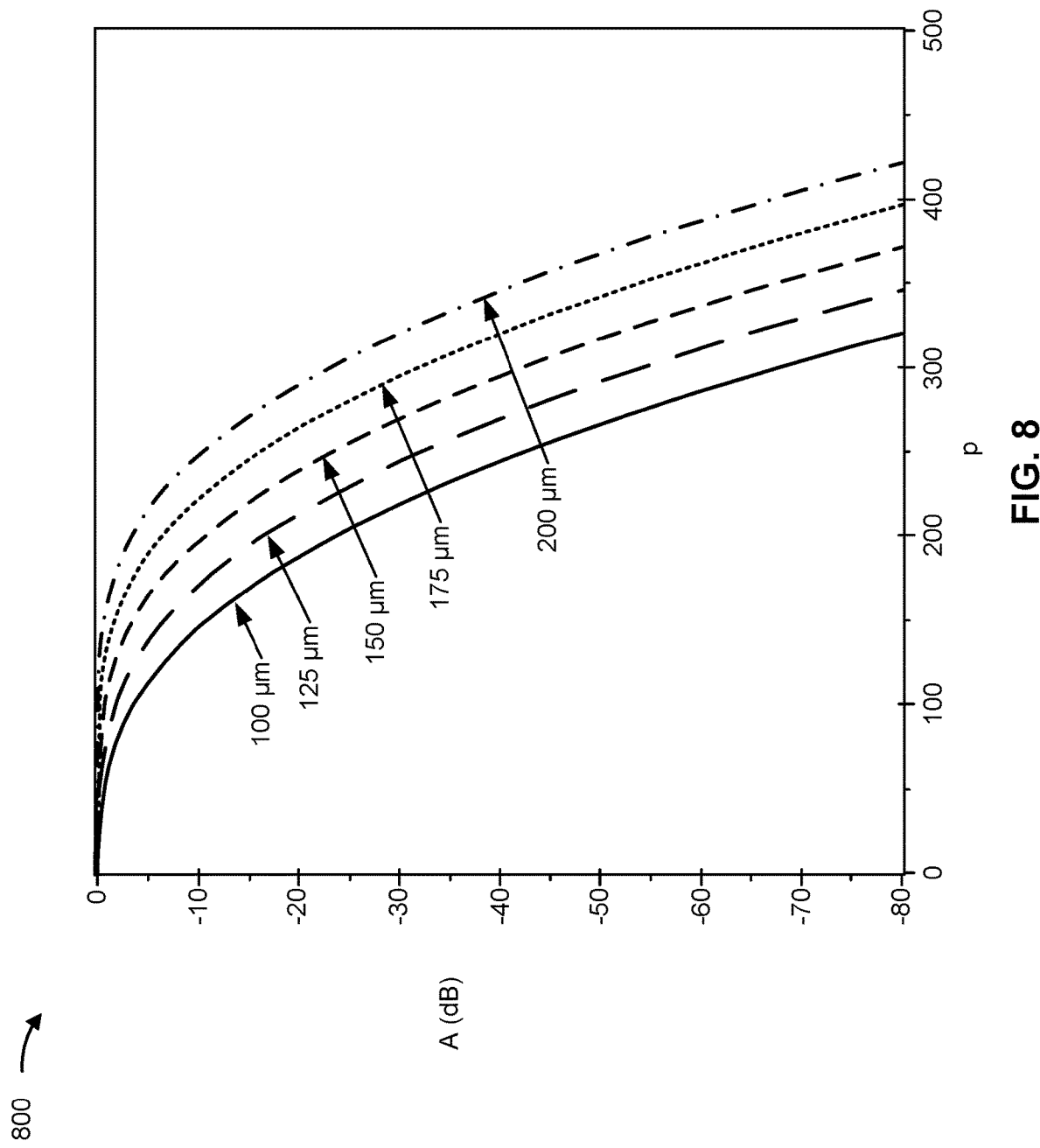
FIG. 8 is a graph of power attenuation against beam separation for a selection of example aperture sizes.

FIG. 8 shows the effect of aperture size and beam separation p (in microns) on the power attenuation A, with a beam radius (i.e. $1/e^2$ radius) of 80 microns, for apertures of radius 100 microns, 125 microns, 150 microns, 175 microns, and 200 microns. Note that unlike in FIG. 7, the x-axis scale here is the absolute beam separation p, rather than the beam separation as a multiple of the Gaussian beam radius (p/r). FIG. 8 considers only the contribution to the power attenuation from the blocking of the secondary beam, i.e. the first and second beam are assumed to be the same initial power. In practice, there will be additional power attenuation since the secondary beam is the result of additional reflections within the optical assembly. The aperture size may be defined by an external aperture, e.g. an opaque structure having an aperture which excludes light from the detector, or may be defined by the size of the sensitive area of the detector.

Figure 9:
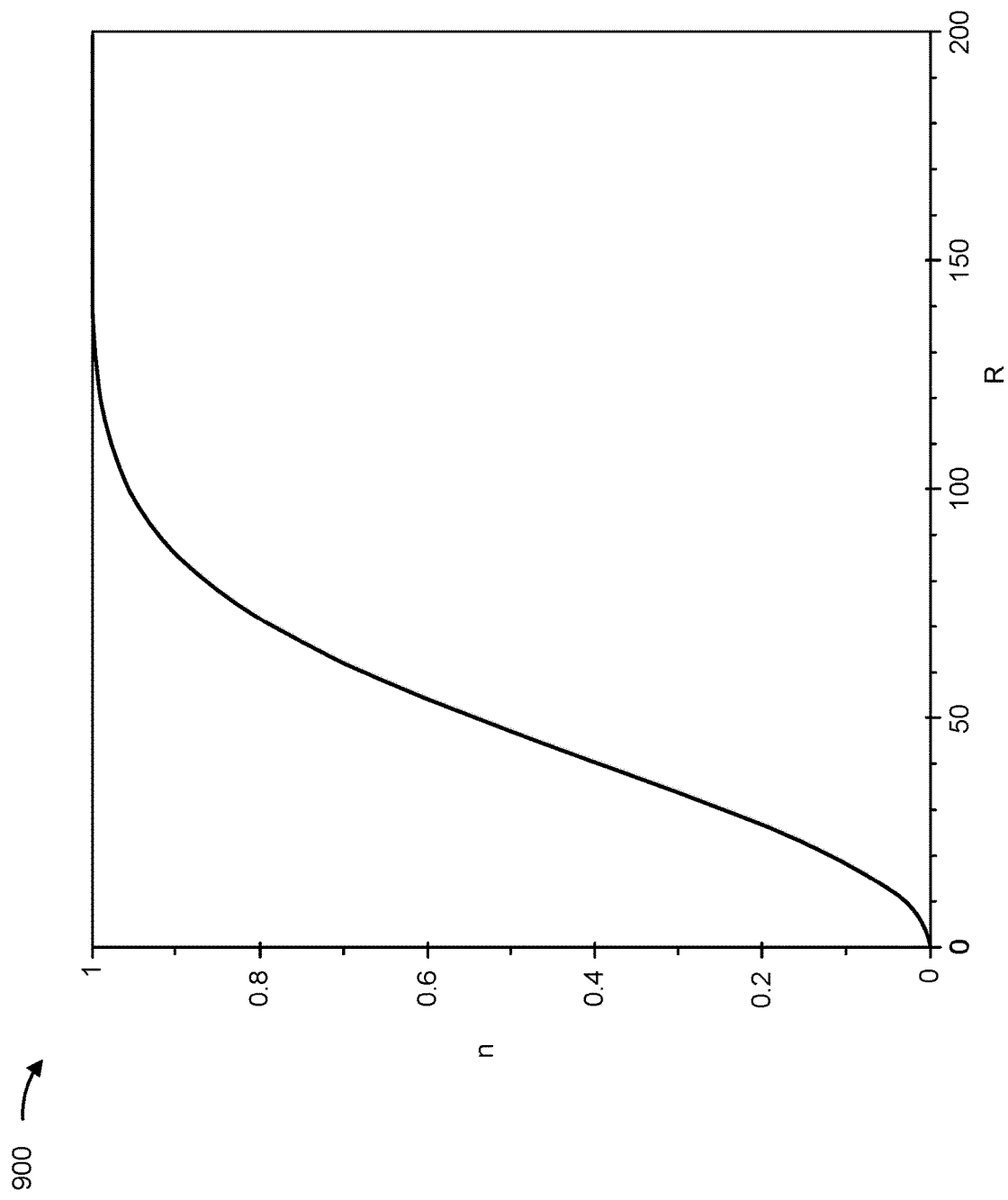
FIG. 9 is a graph of detection efficiency against aperture radius.

FIG. 9 shows the detection efficiency n of the first beam against aperture radius R for the same 80 micron beam radius as FIG. 8. As can be seen from these two figures, the selection of aperture radius is a trade-off between efficiency and interference. At lower aperture sizes, smaller beam separation is required to achieve a given level of power attenuation, but the detection efficiency of the desired output beam decreases. As an example, for a 100 micron aperture, about 96% of the beam power is detected, and the separation between beams can be reduced to 250 microns while maintaining an power ratio between the first and second beam of 45 dB. Other contributions to the attenuation of the secondary beam as described above would cause the total power ratio to be greater than 50 database.

The geometry of the optical assembly may be chosen to ensure that the power ratio of the first output beam to the second output beam as detected by the output detector is greater than a threshold. This threshold may be greater than 50 dB, more preferably greater than 60 dB, more preferably greater than 70 dB.

To reduce the intensity of the unwanted additional beams from the optical components, faces which produce undesired reflections may be coated with an anti-reflective coating.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the Figures. The spatially relative terms are intended to encompass different orientations of the apparatus, device, and/or element in use or operation in addition to the orientation depicted in the Figures. The apparatus may be otherwise oriented (rotated 90 degrees or at other orientations) and the spatially relative descriptors used herein may likewise be interpreted accordingly.

What is claimed is:

1. An optical assembly comprising:
    an optical cavity;
    one or more detectors; and
    an optical component having an input face and an output face configured to receive an input beam to the input face and to produce one or more primary output beams, and a plurality of secondary output beams from the output face, the secondary output beams resulting from multiple internal reflections within the optical component;
    wherein:
        at least one of the input face is not perpendicular to the input beam or the output face is not perpendicular to the one or more primary output beams;
        each primary output beam is transmitted through the optical cavity perpendicular to at least one surface of the optical cavity, and directed to a respective one of the one or more detectors; and
        each detector is arranged to exclude at least a portion of each secondary output beam.

2. The optical assembly of claim 1, wherein an angle $\theta_{in}$ between the input beam and a normal of the input face is equal to an angle $\theta_{out}$ between the one or more primary output beams and a normal of the output face.

3. The optical assembly of claim 1, wherein the input face and the output face do not form a further optical cavity.

4. The optical assembly of claim 1, wherein the optical component is at least one of:
    a beam splitter;
    a mirror block comprising one or more internal mirror surfaces; or
    a prism.

5. The optical assembly of claim 1, wherein the optical component has an anti-reflective coating on at least one of the input face or the output face.

6. The optical assembly of claim 1, further comprising an opaque structure configured to block at least another portion of each secondary output beam from reaching the one or more detectors.

7. The optical assembly of claim 1, wherein the optical cavity is an etalon.

8. The optical assembly of claim 1, wherein at least one of:
    an angle $\theta_{in}$ between the input beam and a normal of the one or more primary output beams is between 1 and 15 degrees; or
    an angle $\theta_{out}$ between the output beam and a normal of the one or more primary output beams is between 1 and 15 degrees.

9. The optical assembly of claim 1, wherein a power ratio of each primary output beam to a corresponding secondary output beam as detected by the respective detector is greater than 50 dB.

10. An optical assembly comprising:
    an optical cavity;
    one or more detectors; and
    an optical component having an input face and an output face configured to receive an input beam to the input face and to produce one or more primary output beams, and a plurality of secondary output beams from the output face, the secondary output beams resulting from multiple internal reflections within the optical component, wherein:

at least one of the input face is not perpendicular to the input beam or the output face is not perpendicular to the one or more primary output beams;

the input beam is received from the optical cavity and is perpendicular to at least one surface of the optical cavity;

each primary output beam is directed to a respective one of the one or more detectors; and each detector is arranged to exclude at least a portion of each secondary output beam.

11. The optical assembly of claim 10, wherein an angle $\theta_{in}$ between the input beam and a normal of the input face is equal to an angle $\theta_{out}$ between the one or more primary output beams and a normal of the output face.

12. The optical assembly of claim 10, wherein the input face and the output face do not form a further optical cavity.

13. The optical assembly of claim 10, wherein the optical component is a prism or a mirror block comprising one or more internal mirror surfaces.

14. The optical assembly of claim 10, wherein the optical component has an anti-reflective coating on at least one of the input face or the output face.

15. The optical assembly of claim 10, further comprising an opaque structure configured to block at least another portion of each secondary output beam from reaching the one or more detectors.

16. The optical assembly of claim 10, wherein the optical cavity is an etalon.

17. The optical assembly of claim 10, wherein at least one of:

an angle $\theta_{in}$ between the input beam and a normal of the input face is between 1 and 15 degrees; or an angle $\theta_{out}$ between the one or more primary output beams and a normal of the output face is between 1 and 15 degrees.

18. The optical assembly of claim 10, wherein a power ratio of each primary output beam to a corresponding secondary output beam as detected by the respective detector is greater than 50 dB.

\* \* \* \* \*